F. A. STEVENS.
FRAME FOR EYEGLASSES AND SPECTACLES.
APPLICATION FILED FEB. 21, 1917.

1,236,497.

Patented Aug. 14, 1917.

Inventor:
Frederick A. Stevens
By Horatio E. Bellows
Attorney.

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

FRAME FOR EYEGLASSES AND SPECTACLES.

1,236,497.   Specification of Letters Patent.   Patented Aug. 14, 1917.

Application filed February 21, 1917. Serial No. 150,033.

*To all whom it may concern:*

Be it known that I, FREDERICK A. STEVENS, a citizen of the United States, residing at Providence, in the county of Providence and State of Rhode Island, have invented certain new and useful Improvements in Frames for Eyeglasses and Spectacles, of which the following is a specification.

My invention relates to frames for eyeglasses and spectacles, and particularly to a removable device in the rims.

Manufacturers of frames market them without the lenses, usually attaching to each frame a tag indicating the quality and dimensions of the article to which it is attached. The purchasing optician, after testing the patient's eyes, inserts the individually required lenses into the frame identified as adapted to accommodate a lens of such a size. It usually happens, however, that the rims of the frame when ready for use have interior dimensions materially different from the dimensions originally indicated therefor. This is due to changes of temperature, bending, and other circumstances; and when the rims are of celluloid, which is the most usual material for rims at the present time, the warping and shrinking of these rims are excessive.

The essential objects of my invention are to form a support or brace for the rim of a frame against collapse, warping, or shrinking; to combine in such a means means for indicating the dimensions, and identify the axial line of the rim; to avoid the use of tags; to provide a bracing means which will permit by means of the frame itself a test for required facial dimensions; and to attain these ends by a device simple to construct, inexpensive to manufacture, durable in character, and adapted to facile insertion and removal, and which shall not easily be lost.

To the above ends essentially my invention consists in such parts and combinations of parts as fall within the scope of the appended claims.

In the accompanying drawings which form a part of this specification—

Figure 1:
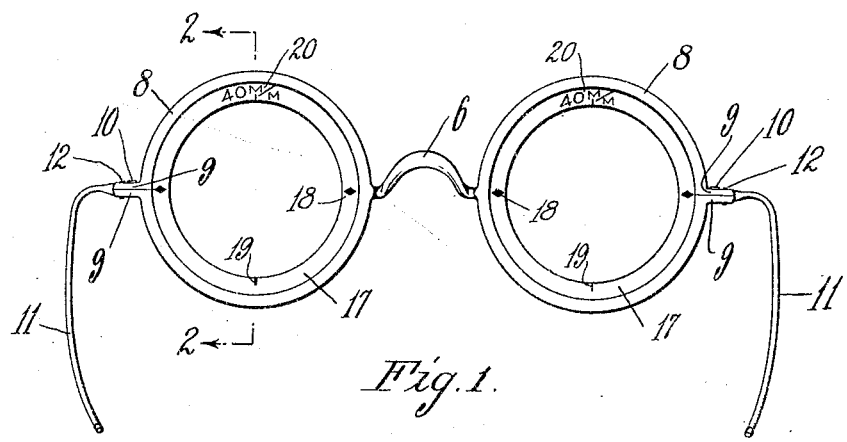
Figures 2, 3:
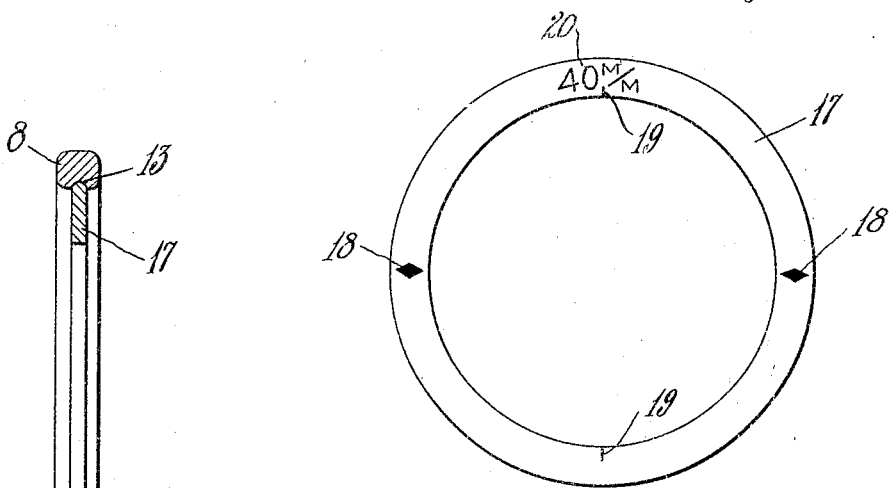

Figure 1 is a front elevation of a pair of spectacles embodying my invention,

Fig. 2, a section of the same on line 2—2 of Fig. 1,

Fig. 3, a front elevation of the brace, and

Figure 4:
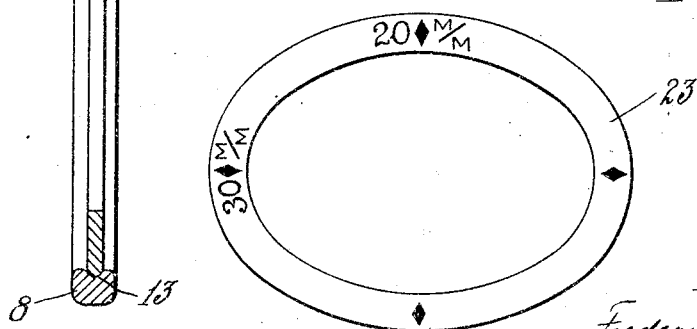

Fig. 4, a similar view of reduced dimensions of a modified form of the same.

Like reference characters indicate like parts throughout the views.

In the present instance, my invention is illustrated as embodied in a spectacle frame comprising the bridge 6 attached to rims 8 which, in this instance, are of celluloid; the rims being split as usual and provided with the usual end pieces 9 connected by screws 10, and carrying temples 11 attached by dowels 12.

The rims 8 are provided upon their interiors with grooves 13 forming peripheral seats to accommodate flat annular braces 17, and to ultimately receive the lenses. In the present instance, these braces are of aluminum which are light, tough, and non-frangible, and have a light surface. At diametrically opposite sides of each brace are marks 18 upon the inner margin of its face that represent an axial line of vision, which is convenient if and when the frames are being used to test the eyes for pupilary distances. Similar oppositely disposed marks 19 may be accompanied by measurement inscriptions 20 indicating, for instance, the measurement in millimeters of the lens adapted to the rim.

Each brace is seated in a groove 13, and when the lens is ready to be inserted into the groove 13, the brace is removed. If and when the brace is of a metal with sufficient resiliency, the brace may be manually sprung into and out of its seat. When the material is rigid, it is found more convenient for these purposes to loosen the screw 10, and separate the split end of the rim.

It will be observed that the snug engagement of the brace along its entire periphery with the inner face of the rim insures against any warping or bending of the latter and that the face of the brace affords an area adapted for receiving n rkings of dimensions that are permanent in character and not liable to be lost or confused. Further, it will be seen that the brace, before it is discarded for the lens, may be employed for visual examination because of the great area of its opening, and this purpose is rendered more complete when the axial marks are present.

The braces 17 may have an outline other than circular to accommodate a non-circular rim. If, for instance, the rim is oblong or elliptical, the ring 23 may be of similar form such as shown in Fig. 4.

I claim:—

1. In eyeglasses or spectacles, the combination with the rims, of removable open braces frictionally engaging the interior of the rims.

2. In eyeglasses or spectacles, the combination of rims provided with internal seats, and removable open braces mounted in the seats.

3. In eyeglasses or spectacles, the combination of rims, and annular metallic braces mounted in the rims and bodily removable to allow of lenses being inserted in their stead.

4. In eyeglasses or spectacles, celluloid rims or the like, and rigid parts removably retained therein.

5. In eyeglasses or spectacles, celluloid rims or the like, and rigid metal parts removably retained therein to brace the same and prevent warping.

In testimony whereof I have affixed my signature in presence of two witnesses.

FREDERICK A. STEVENS.

Witnesses:
CHARLES S. JENCKES,
MARY A. SULLIVAN.